Oct. 7, 1958  W. F. ALLER  2,854,756
GAUGING DEVICE FOR CHECKING SIZE OR CONTOUR
Filed Nov. 4, 1950  3 Sheets-Sheet 1
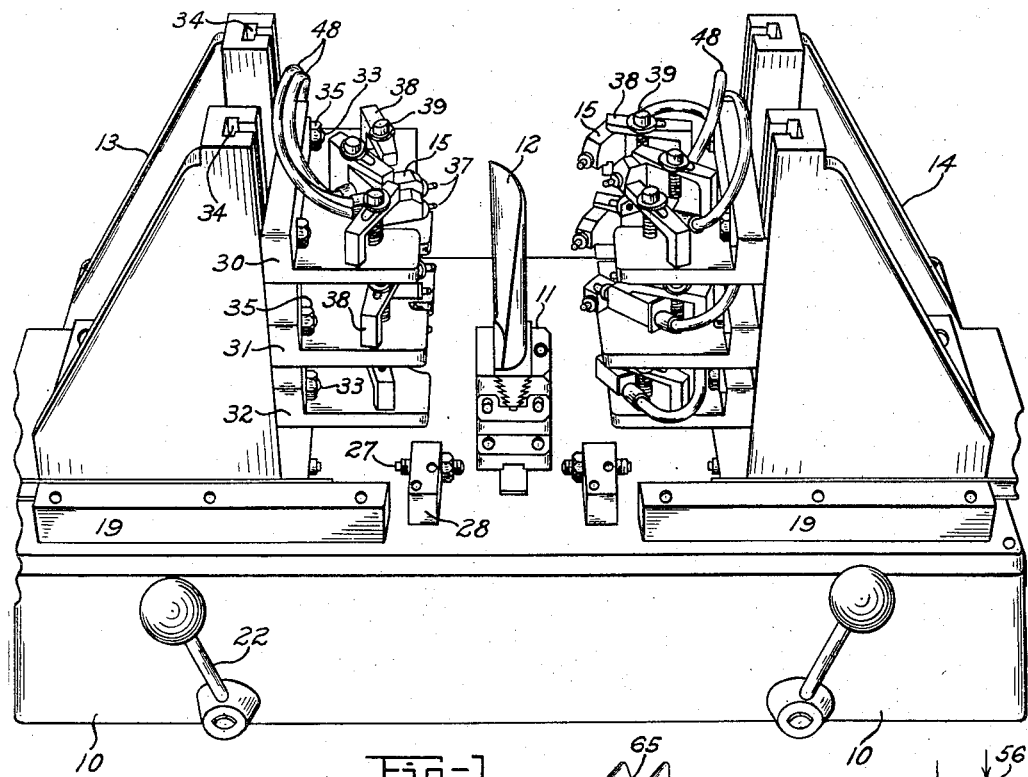
Fig-1
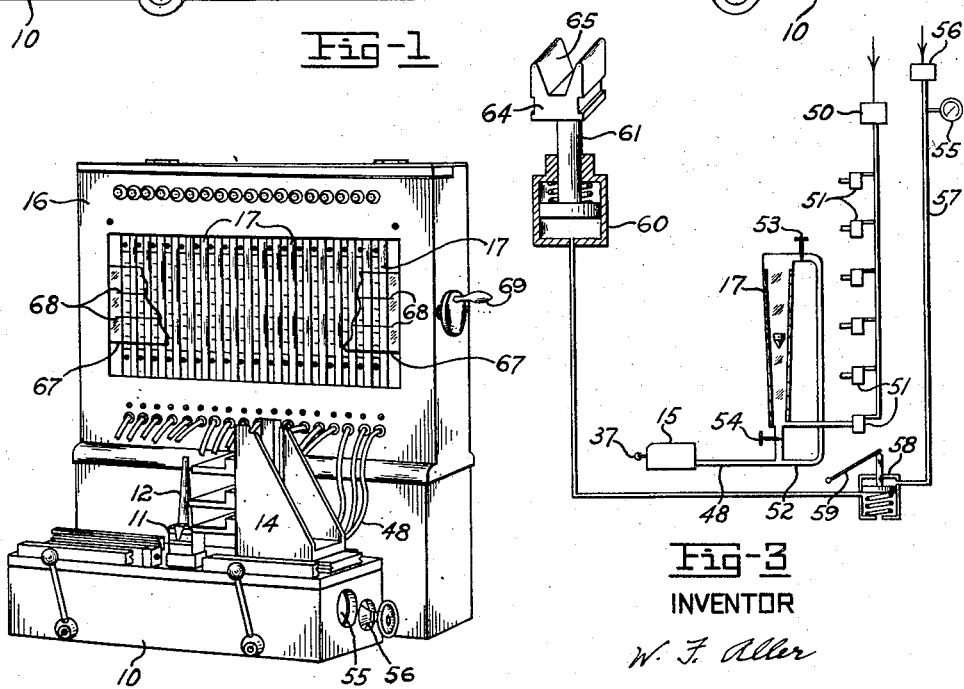
Fig-2
Fig-3
INVENTOR
W. F. Aller
BY
Edward J. Noe
atty Oct. 7, 1958 W. F. ALLER 2,854,756
GAUGING DEVICE FOR CHECKING SIZE OR CONTOUR
Filed Nov. 4, 1950 3 Sheets-Sheet 2

INVENTOR
W. F. Aller
BY Edward T. Noij
atty.

Oct. 7, 1958  W. F. ALLER  2,854,756
GAUGING DEVICE FOR CHECKING SIZE OR CONTOUR
Filed Nov. 4, 1950  3 Sheets-Sheet 3
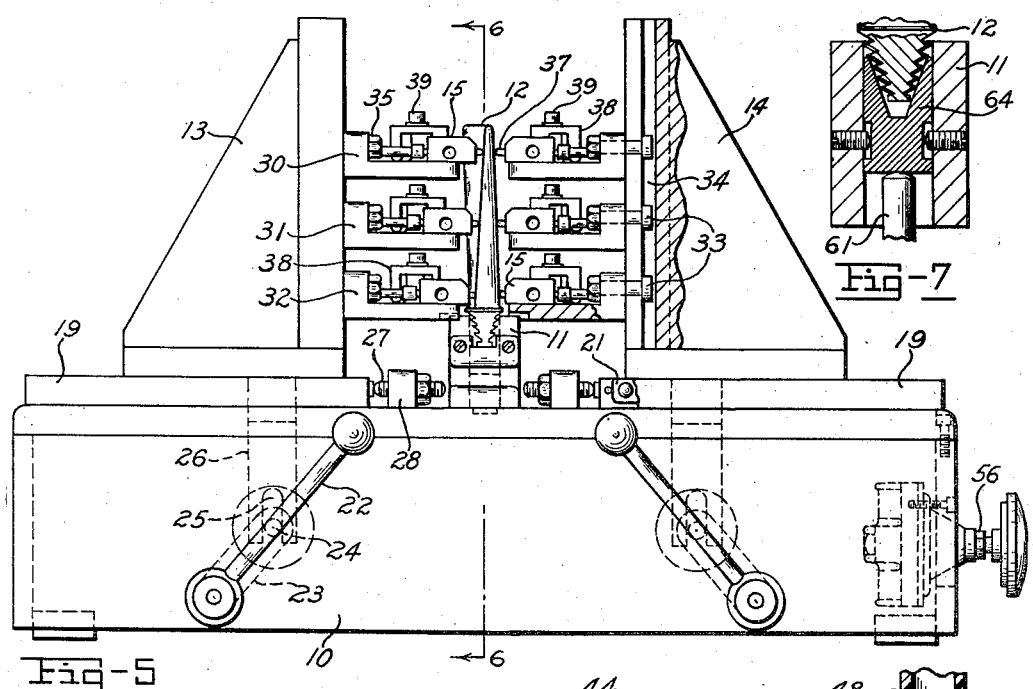
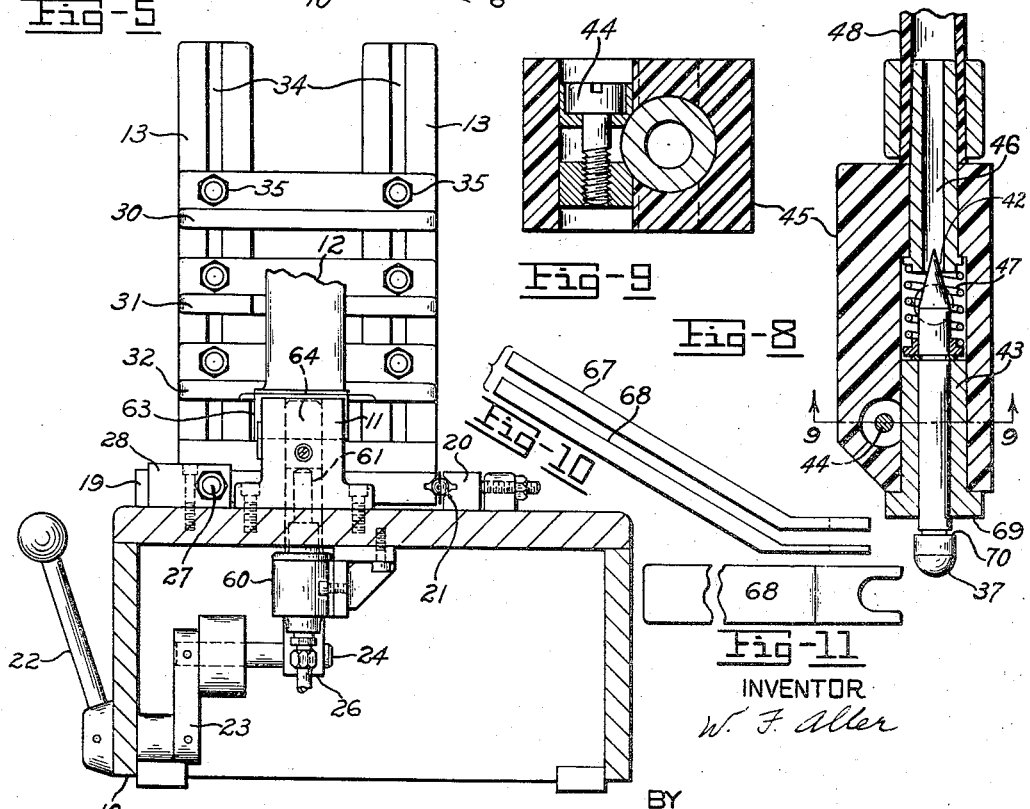
INVENTOR.
W. F. Aller
BY Edward T. Noy
atty.

United States Patent Office 2,854,756
Patented Oct. 7, 1958

2,854,756

GAUGING DEVICE FOR CHECKING SIZE OR CONTOUR

Willis Fay Aller, Dayton, Ohio, assignor, by mesne assignments, to The Sheffield Corporation, a corporation of Delaware Application November 4, 1950, Serial No. 194,181

6 Claims. (Cl. 33—174)

This invention relates to gauging apparatus and more particularly to apparatus for gauging contours or size of an object.

One object of the invention is the provision of a gauging apparatus of the character mentioned having provision for conveniently adjusting a number of gauge heads on a common carrier so that the gauge heads can be used for cooperation with any desired portions of the workpiece, each gauge head having gauging means cooperating with the workpiece and controlling indicating means whereby the size or contour of the workpiece or object can be ascertained.

Another object of the invention is the provision of a gauging apparatus having a carrier and a work holding means that are relatively movable and adapted to be brought into predetermined relative positions with a series of gauge heads adjustably mounted on the carrier and each gauge head having a work contactor cooperating with the workpiece and effecting the operation of indicating means so that the contour of the workpiece can be readily compared with a standard or master.

Another object is the provision of a gauging apparatus having a pair of movable carriers operable towards and from the workpiece and having gauging means for cooperation with the sides of the workpiece facing towards the carriers.

Another object is the provision of a gauging apparatus of the character mentioned having means for conveniently adjusting the work heads on the carrier so that the portions thereof which cooperate with the workpiece are arranged in any desired plane and at any desired spacing in those planes.

Other objects and advantages of the invention will be apparent from the following description, the appended claims and the accompanying drawing, in which, Fig. 1 is a perspective view of the portion of a gauging apparatus embodying the present invention and showing the work and carrier portions;

Fig. 2 is a perspective view on a reduced scale showing the gauging device with one of the carriers removed;

Fig. 3 is a diagrammatic view illustrating a fluid system which may be employed;

Fig. 5 is a front elevation of a portion of the gauging apparatus showing the carriers moved into gauging position;

Fig. 6 is a section on the line 6—6 of Fig. 5;

Fig. 7 is a detail showing the work clamp;

Fig. 8 is a section on the line 8—8 of Fig. 4, on an enlarged scale;

Fig. 9 is a section on the line 9—9 of Fig. 8;

Fig. 10 is a detail showing the setting masters that may be employed with the gauge heads for setup purposes; and Fig. 11 is an end view of one of the setting masters.

Figure 4:
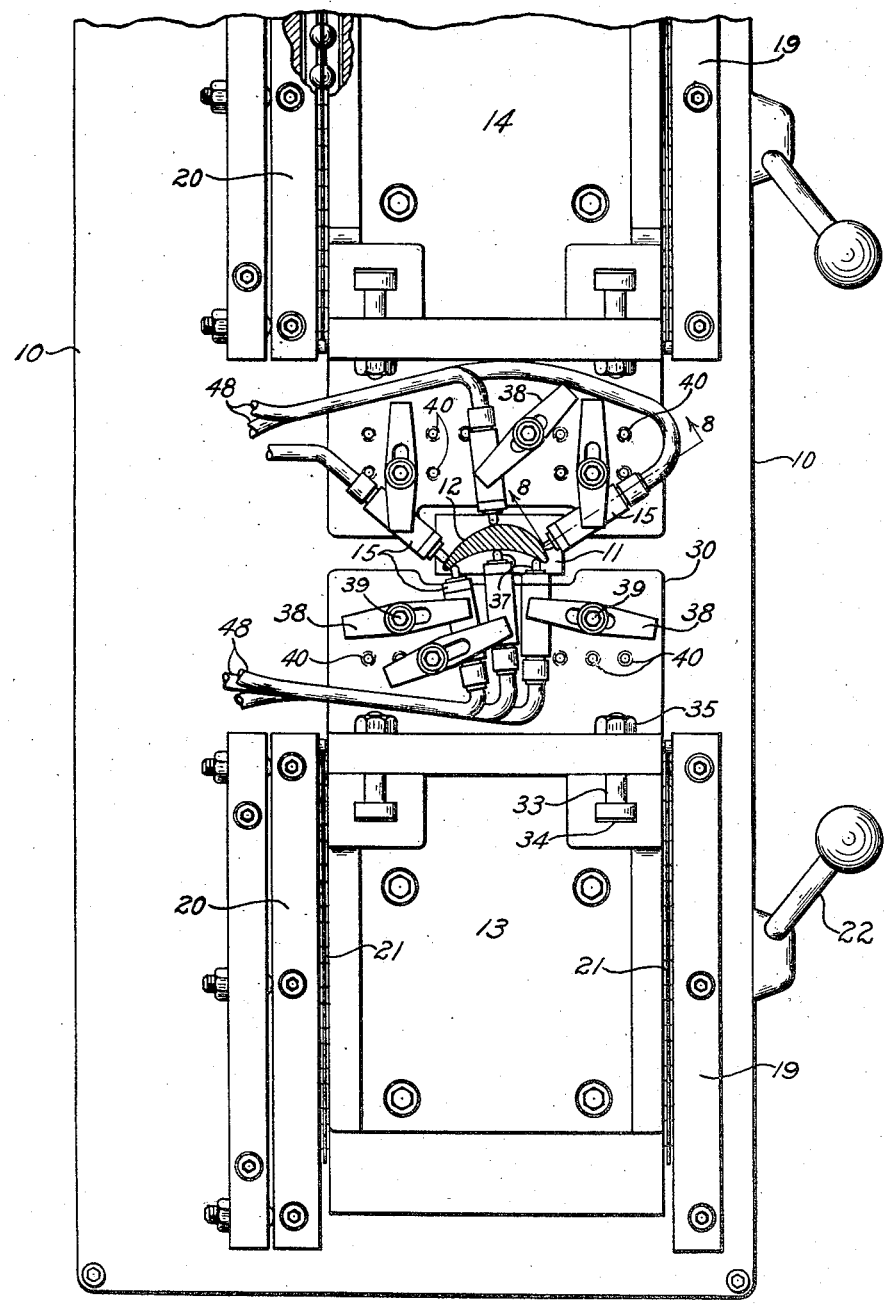
Fig. 4 is a top plan view of the apparatus illustrated in Fig. 1.

Referring more particularly to the drawing in which the same reference numerals designate like parts in the different views, the gauging apparatus as herein illustrated shows an embodiment of the invention adapted for checking the thickness and contour of a curved blade such as a turbine blade. It should be understood, however, that the invention is not limited to these particular functions and that other articles may be gauged or checked with other masters of any size or shape, and the term "workpiece" as herein used is to designate any particular article that may be gauged.

As will be noted from Figs. 1, 2, and 4, the gauging apparatus, in general, comprises a support or base 10 on which is a work holder 11 for holding the workpiece 12. The support also mounts a pair of carriers 13 and 14 at opposite sides of the workpiece, these carriers being mounted for movement from their retracted positions as shown in Fig. 1 to gauging positions as illustrated in Fig. 5. Each carrier is provided with a number of gauge heads 15 which can be conveniently adjusted so that the carrier grouping can be readily changed to accommodate the particular shape or size of the workpiece to be gauged. Each of the work heads has gauging means for cooperation with the workpiece and controls the operation of an indicating or measuring device arranged in an indicator standard 16. Although the invention in its broadest aspects is not limited to the particular form of gauging measurement herein described, it is preferred that the gauging means of the work heads should control air flow through leakage paths determined by the workpiece size or shape. The flow through these leakage paths is shown by flow responsive means such as vertical tapered tubes 17 having indicating floats movable therein in accordance with the amount of flow taking place through these tubes which are in communication at their lower ends with a source of air under pressure and at their upper ends communicate with the fluid leakage nozzles, the flow through which is determined by the workpiece itself.

The carrier 13 is slidably mounted on the support 10 by means of parallel guide strips 19 and 20, antifriction members 21 being preferably interposed between the lower portions of the carrier and the guide strips as shown in Fig. 6. Movement of the carrier is effected by control handle 22 pivotably mounted on the support 10 and fixed to an arm 23. A post 24 is fixed to the arm 23 and operates in the bifurcated end 25 of a downwardly extending projection 26 fixed to the carrier. By moving the handle 22 in a clockwise direction, see Fig. 1, it will be apparent that the carrier will be moved from its retracted position until the carrier engages a stop 27 adjustably mounted in a stop block 28 which is fixed on the support 10. This brings the carrier into a predetermined gauging position.

Adjustably mounted on the carrier for vertical adjustment thereon are brackets 30, 31 and 32. A greater or lesser number of brackets may be employed. Each bracket has adjusting bolts 33 with their heads arranged in V slots 34 of the carrier. Nuts 35 when tightened hold the brackets securely in position although it will be obvious that the brackets can be vertically adjusted in a convenient manner to change their plane with respect to the workpiece.

Each bracket supports a series of gauge heads 15 the positions of which on the bracket may be conveniently changed to place them in different gauging positions in accordance with the particular gauging operation to be performed. The gauge head 15 is a small compact member having a work contactor 37 movable in the gauge head body, the lower side of the gauge head being preferably flat so the gauge head may be clamped tight on the upper surface of the bracket by a holding clamp 38 which is held down by a clamp bolt 39 engageable with any one of a plurality of threaded bolt holes 40 in the bracket.

The clamps may be variously positioned and extend various distances from their respective brackets. Quite a number of gauge heads may be placed on each bracket and may be placed to extend in different directions and to different extents with respect to the workpiece. They are clamped in position, as shown in Fig. 4, so that when the carrier is in gauging position, the work contactors will all be in gauging association with a workpiece of desired form and they are set in this position by means of a master or reference workpiece of known dimensions as will be more fully described. The various work contactors carried by one of the brackets are thus arranged to contact the workpiece in a common horizontal plane and in a similar manner each of the other brackets carry other series of gauging heads with work contactors so that the workpiece, at the side facing the carrier 13, may be engaged at several points in each of several different geometric planes to obtain an indication of the surface contour.

The carrier 14 is similarly constructed and arranged so as to carry several series of gauge heads with work contactors arranged in several different geometric planes so that the other side of the workpiece will be gauged and, by reason of the relationship of the indications at directly opposing gauging zones, the workpiece thickness at each gauging zone can also be determined.

Each of the gauge heads incorporates a fluid leakage opening controlled by the work contactor 37, the construction and arrangement of the gauge head itself and the setting method involved being more fully set forth in the prior application of Aller, Serial No. 179,992, filed August 17, 1950, now Patent No. 2,691,827, granted October 19, 1954. In general, the work contactor 37 is slidable in a sleeve 43 which is fixed by clamping device 44 in the body 45. The end of the work contactor is pointed and extends part way into the end of an orifice tube 46 which is held in a definite position by a spring 47. The tube 46 is connected to a flexible conduit 48 and as shown in Fig. 3 this conduit extends to a fluid flow gauging device of suitable character, shown for example as an upwardly flaring tapered tube 17. Air under pressure is supplied through a pressure regulator 50 and through auxiliary pressure regulators 51, one to each of the gauging heads. Each of these regulators 51 supplies air under controlled constant pressure to the lower side of a tapered tube 17. The upper side of the tube is connected by a passage 52 to the conduit 48, and control valves 53 and 54 are provided as indicated for the control of amplification and to obtain the desired reading on the scale which is alongside the tube. The height of the float in the tapered tube gauges the amount of air leakage taking place through the leakage orifice 42 which is formed by the end of the orifice tube 46 and the tapered end of the work contactor, and the size of this orifice is governed directly by the workpiece itself.

Air is also supplied under pressure through another pressure regulator 56 to a flexible tube 57. An air pressure indicator 55 may show the pressure existing in this tube which extends to a control valve 58 controlled by foot pedal 59 which controls the supply of fluid to and the exhaust from the pressure cylinder 60 which operates a work clamping plunger 61 as will be more fully referred to.

The base of the workpiece is held securely by suitable clamping means. As shown, the workpiece has a base of generally triangular cross-section with each side having grooves and ridges. The ridges of this base fit loosely into the mating grooves on the side walls of the work holder 11 and the workpiece may be moved towards the right as viewed in Fig. 6 until the base is stopped at a definite position by a suitable projection 63 on the base that engages the workholder 11. The workpiece is then clamped upwardly to securely engage the ridges on the workpiece base with the grooves of the workholder. The clamping means comprise a V-shaped clamp 64 slidable vertically in the workholder and controlled by the plunger rod 61. Clamp 64 has smooth inclined clamp walls 65 that engage the outer portions of the ridges on the workpiece base. The clamp 64 is arranged in a recess in the middle portion of the work holder where the ribs on the work holder are removed for this purpose. When the clamp is moved upwardly it will be obvious that the workpiece is held firmly in gauging position.

A master or reference piece of known or desired shape and dimensions may be inserted in the work holder and clamped in position. The carrier 13 may be moved over into gauging position and the various gauge heads 15 adjusted on the several brackets so that the workpiece is contacted at desired or specified gauging zones. Each gauge head is then moved to an exact position such that the work contactor is moved by the workpiece to a position that gives an orifice or leakage opening of such size that the float level on the air gauge will be at a desired point or level. A vertically adjustable transparent screen 67 in front of all the indicating tubes 17 may have indicating lines 68 defining maximum and minimum tolerance positions and this screen may be properly positioned by the control handle 69 so that the float level reading obtained with the master in place will be at a desired point. Each of the gauge heads is correspondingly adjusted until all of the readings of all of the floats are in line, if the master is of nominal size or of true oversize or undersize at the permissible limit of tolerance. The valves 53 and 54 in the fluid system are used to give any necessary proper adjustment to the float level positions. Suppose this master that is used for setup has a size contour that is perfect, then all the floats may be set up by properly positioning the gauge heads and by the control of the air gauge valves so they are all midway between the indicating lines 68, these indicating lines being so spaced as to define maximum and minimum permissible tolerances.

When a workpiece of unknown size is then substituted for the master and the carriers 13 and 14 moved towards one another until stopped in gauging position, the various float levels will then indicate any deviation from normal, or any deviations which exceed the permissible tolerance limits, and moreover, since the three air gauge tubes that are connected to any three of the gauge heads on a common bracket are arranged alongside one another, the relative positions of the floats on these three tubes will indicate the general amount of deviation from a proper size or contour. It will also be understood that by having two different carriers with gauging elements contacting opposite sides of the workpiece there will be a balance of force on the workpiece due to the pressure the work contactors exert so the workpiece itself will not be deflected.

It is unnecessary to have a master of exact known size. It is sufficient if the master employed is one that has been previously calibrated so that at each gauging zone any deviation from normal is known. This master may be used for setup purposes in the same manner as when a true exact master is employed except that the gauge head is so positioned on its carrying bracket that the indication produced by the float will differ from a normal or zero position to the proper degree to properly indicate that particular deviation that exists from normal at that particular gauging zone.

For setup purposes gauge head setup feelers 67 and 68 are employed. The setup feeler 68 for example has a bifurcated end that may be inserted between the surface 69 on the bushing 43 and the surface 70 on the head end of the work contactor. The end of the work contactor is then engaged with the reference master with the carrier in gauging position and the body 45 of the gauge head is then clamped in such position that the reference master holds the feeler between the surfaces 69 and 70. The feeler 68 is then removed. The master employed under these conditions is one that moves the work contactor to the greatest extent within permissible tolerances or in other words a true oversize master. If a true undersize master is available then the setup feeler 67 is employed. The difference in the thickness of the feeler portions of the two feelers 67 and 68 corresponds to the exact tolerance differential that exists between maximum and minimum oversize permissible measurements. Only one master need be employed and the proper setup feeler used with it, the other setup feeler determining the air gauge indication for the opposite tolerance limit.

It will be understood that a reference part may be used which is not perfect but which has been calibrated so that its variations from a perfect form are known. Under these conditions, and also in the case the master is of true form and size, the valves 53 and 54 for the indicating means of any gauge head are adjusted so that with the setup feeler 67 in place and the operator pressing work contactor 37 by his finger against the setup feeler, the float will be at one permissible tolerance limit position. The operator then substitutes the other feeler and presses the work contactor merely by his finger against the feeler and adjusts the valves 53 and 54 until the float is at the other tolerance limit position. The feeler is then removed from the gauge head and the latter is then attached on its carrier bracket while the carrier is in gauging position until the work contactor is moved by the calibrated reference part or master so that the air gauge reading properly indicates the exact reading that should exist for that particular master. To recalibrate after a period of use, the operator can very readily ascertain that the air gauge itself is properly responding merely by pressing the work contactor in with his finger first against the minimum setup feeler and then against the maximum setup feeler and seeing that the float levels are all at the tolerance limit position. By inserting the calibrated master and bringing the carrier into gauging position, he can again see that the float level properly indicates the size or form of the particular reference master employed. This is of course a great convenience and economy because it is unnecessary to have either a minimum or a maximum master of exact form or size. Any workpiece can be employed if it has been precisely calibrated and its deviations from normal are not excessive and are known.

While the form of apparatus and the method herein described constitute preferred embodiments of the invention, it is to be understood that the invention is not limited to the precise form of apparatus or method, and that changes may be made therein without departing from the scope of the invention which is defined in the appended claims.

What is claimed is:

1. Gauging apparatus for checking the contours of a working face of a fluid reactant blade or the like, comprising a base, means for supporting a blade on said base, a carrier slidably mounted on said base, a plurality of gauging means, clamp means for independently fixing the position of each gauging means on said carrier for simultaneous association with the blade face at a plurality of points in each of a plurality of substantially chordwise gauging planes relatively displaced along the blade length, each gauging means including a movable work contactor for engagement with the blade face at one of said points and an orifice controlled thereby to vary leakage flow of air supplied under pressure to the orifice, a series of indicating devices individually connected to the orifices responsive to the leakage therethrough, each of said indicating devices comprising rectilinearly responsive indicating means, means mounting said indicating devices in adjacent parallel relationship in a common panel for ready observance at the same time, stop means on said base for cooperation with said carrier to limit its movement and locate said gauging means and the respective orifices in predetermined gauging positions, and means for sliding the carrier from a retracted position forward into engagement with said stop means and to a predetermined gauging position to bring the work contactors into contact with the blade for positioning engagement relative to the respective orifices in accordance with the blade contour in the chordwise gauging planes.

2. Gauging apparatus for checking contours of a workpiece and the workpiece thickness at selected locations, comprising a base having a work supporting portion, a carrier slidably mounted on said base for movement toward and from one side of the work from a retracted position for loading forward to gauging position, a second carrier slidably mounted on said base for movement toward and from the opposite side of the work from a retracted position for loading forward to gauging position, each carrier having a plurality of gauging means arranged for simultaneous association with distributed points on the work surface with at least some of the gauging means of one of the carriers being oppositely disposed to some of the gauging means of the other carrier for thickness measurement of the workpiece at predetermined locations and a counterbalancing force effect on the workpiece, clamp means for independently fixing the position of each of said gauging means on the respective carriers, means for moving the carriers to predetermined gauging positions to bring the gauging means into association with the workpiece surfaces, stop means on said base for limiting the forward movement of each of the carriers at the respective gauging positions, said gauging means being adapted for connection to devices for determining workpiece thicknesses and surface contours with the carriers so located.

3. A gauging apparatus for checking contours of a workpiece comprising a base having a work supporting portion, carrier means mounted on said base for movement toward and from one side of the work from a retracted position for loading forward to gauging position, carrier means mounted on said base for movement toward and from the opposite side of the work from a retracted position for loading forward to gauging position, a series of gauging means for each of said carriers, clamp means for adjustably and independently fixing each of said gauging means to the respective carrier means for simultaneous association with the work surface in parallel gauging planes with a plurality of gauging means in each plane, at least some of the gauging means on opposite sides of the work being oppositely disposed whereby a counterbalancing force effect on the workpiece is obtained, means for moving the carrier means to gauging positions to bring the gauging means into association with the work surfaces, stop means on said base for limiting the forward movement of each of said carrier means at the respective gauging positions and indicators individually connected to said gauging means so that various indications may be compared with other indications to determine the surface contours in the gauging planes and the thickness of the work at selected positions.

4. Gauging apparatus for checking contours of a workpiece and its thickness comprising a base having a work supporting portion, a carrier slidably mounted on said base for movement toward and from one side of the work from a retracted position for loading forward to gauging position, a second carrier slidably mounted on said base for movement toward and from the opposite side of the work from a retracted position for loading forward to gauging position, each carrier having a series of gauging means arranged at different levels with a plurality of gauging means at each level, clamp means for independently fixing the position of each gauging means on its respective carrier, the gauging means of the two carriers being oppositely disposed for association with opposite points on the work surfaces whereby a counterbalancing force effect on the workpiece is obtained, each gauging means including a movable work contactor for engagement with the work and an orifice controlled thereby to vary leakage flow of air supplied under pressure to the orifice, means for moving the carriers toward gauging positions to bring the work contactor into engagement with the work, stop means on said base for limiting the forward movement of each of the carriers at the respective gauging positions to locate the gauging means and the respective orifices relative to the work, a series of flow responsive indicating devices and means individually connecting the indicating devices to the orifices for response to the flow determined by the relative positions of the respective work contactors and orifices, whereby comparison of the indicating devices shows the contour of the work and the thickness of the work at the gauged positions.

5. A gauging apparatus for checking contours of a workpiece and the thickness of the workpiece at selected locations, comprising a base having a work supporting portion, a carrier slidably mounted on said base for movement toward and from one side of the work from a retracted position for loading forward to gauging position, a second carrier slidably mounted on said base for movement toward and from the opposite side of the work from a retracted position for loading forward to gauging position, each carrier having a series of gauging means arranged for simultaneous association with the work in spaced gauging planes with a plurality of gauging means in each plane, clamp means for independent adjustable fixing of each of said gaging means on its respective carrier, at least some of the gauging means on the two carriers being oppositely disposed for thickness measurement at selected locations, each gauging means including a work controlled orifice, a series of indicating devices individually connected to the orifices, each of said indicating devices comprising rectilinearly responsive indicating means, means mounting said indicating devices in adjacent parallel relationship for ready observance at a point remote from the gauging zone, stop means on said base for limiting the forward movement of each of said carriers at a predetermined gauging position and means for moving the carriers towards limited gauging positions determined by said stop means to bring the gauging means into association with the opposed work surfaces for obtaining easily interpreted indications of the work contours in the gauging planes and the work thickness at the selected locations.

6. Gauging apparatus for checking contours of a fluid reactant blade and the thickness of the blade at selected locations comprising a base, fixture means on said base for detachably holding a blade in a substantially vertical position for gauging, a carrier slidably mounted on said base for movement toward and from one side of the blade from a retracted position for loading forward to gauging position, a second carrier slidably mounted on said base for movement toward and from the opposite side of the blade from a retracted position for loading forward to gauging position, supporting platforms, means adjustably mounting a plurality of said platforms at different levels on each of said carriers, a plurality of gauging means, clamp means for independently clamping each of a series of gauging means on each of said platforms for association with the adjacent blade face in parallel chordwise gauging planes with a plurality of gauging means in each plane, the gauging means on the two carriers being oppositely disposed for thickness measurement at selected locations and a counterbalancing force effect on the blade, each gauging means comprising a movable work contactor, a series of vertically arranged indicating devices grouped in parallel relation and individually connected to the gauging means, means for moving the carriers toward the opposite sides of the blade to bring all the work contactors simultaneously into engagement with the opposed blade surfaces, and stop means for limiting the movement and positively determining the inward gauging positions of the carriers.

References Cited in the file of this patent

UNITED STATES PATENTS

| | | |
|---|---|---|
| 418,510 | Fiske | Dec. 31, 1889 |
| 634,374 | Stahl | Oct. 3, 1899 |
| 1,565,413 | Brock, Jr. | Dec. 15, 1925 |
| 1,920,259 | Jackson | Aug. 1, 1933 |
| 1,985,576 | Mennesson | Dec. 25, 1934 |
| 2,190,306 | Balsiger | Feb. 13, 1940 |
| 2,337,690 | Stern | Dec. 28, 1943 |
| 2,394,489 | Rowe | Feb. 5, 1946 |
| 2,403,898 | Aller | July 16, 1946 |
| 2,431,099 | Wiseman | Nov. 18, 1947 |
| 2,465,002 | Aller | Mar. 22, 1949 |
| 2,495,891 | Davis | Jan. 31, 1950 |
| 2,569,433 | Highberg | Sept. 25, 1951 |
| 2,571,161 | Poole | Oct. 16, 1951 |
| 2,659,157 | Aller | Nov. 17, 1953 |
| 2,691,827 | Aller | Oct. 19, 1954 |
| 2,697,879 | Tandler | Dec. 28, 1954 |

FOREIGN PATENTS

| | | |
|---|---|---|
| 334,222 | Italy | Jan. 23, 1936 |
| 372,730 | Italy | July 7, 1939 |
| 887,651 | France | Nov. 19, 1943 |

OTHER REFERENCES

Sheffield Bulletin No. 600-1-45, page 6. Received in P. O. June 13, 1949.